United States Patent
Bastide et al.

(10) Patent No.: US 10,719,529 B2
(45) Date of Patent: *Jul. 21, 2020

(54) PRESENTING A TRUSTED TAG CLOUD

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US); Dale M. Schultz, Limerick, ME (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/633,531

(22) Filed: Jun. 26, 2017

(65) Prior Publication Data
US 2017/0300596 A1   Oct. 19, 2017

Related U.S. Application Data

(63) Continuation of application No. 14/253,604, filed on Apr. 15, 2014, now Pat. No. 9,753,998.

(51) Int. Cl.
| G06F 15/16 | (2006.01) |
| G06F 16/26 | (2019.01) |
| G06F 16/28 | (2019.01) |
| G06F 16/9038 | (2019.01) |
| G06F 16/9535 | (2019.01) |
| G06F 16/2457 | (2019.01) |
| H04L 29/08 | (2006.01) |

(52) U.S. Cl.
CPC ........ *G06F 16/26* (2019.01); *G06F 16/24578* (2019.01); *G06F 16/285* (2019.01); *G06F 16/9038* (2019.01); *G06F 16/9535* (2019.01); *H04L 67/02* (2013.01)

(58) Field of Classification Search
None
See application file for complete search history.

(56) References Cited

U.S. PATENT DOCUMENTS

| 8,412,707 | B1 | 4/2013 | Mianji |
| 2006/0248055 | A1 | 11/2006 | Haslam |
| 2007/0288457 | A1 | 12/2007 | Aravamudan |
| 2008/0016098 | A1 | 1/2008 | Frieden |
| 2009/0182727 | A1 | 7/2009 | Majko |
| 2010/0161620 | A1 | 6/2010 | Lamere |

(Continued)

OTHER PUBLICATIONS

List of IBM Patents or Patent Applications Treated as Related; Jun. 26, 2017; pp. 1-2.

*Primary Examiner* — Alex Gofman
(74) *Attorney, Agent, or Firm* — Steven L. Nichols; Fabian VanCott

(57) ABSTRACT

A method for presenting a trusted tag cloud to a user. The method includes associating a number of tags with a first user who applies the tags, calculating a weight of the tags being examined by a second user. The weight may be based on the identity of the second user, the identity of the first user, and examining the relationship between the two. The tags may then be presented to the user in accordance with the value of the weight.

11 Claims, 6 Drawing Sheets

(56) References Cited

U.S. PATENT DOCUMENTS

| | | | |
|---|---|---|---|
| 2011/0029567 A1* | 2/2011 | Banda | G06F 16/907 |
| | | | 707/784 |
| 2011/0161329 A1* | 6/2011 | Winkler | G06F 16/951 |
| | | | 707/748 |
| 2011/0258203 A1 | 10/2011 | Wouhaybi | |
| 2011/0295859 A1 | 12/2011 | Friedman et al. | |
| 2012/0158731 A1 | 6/2012 | Gherman | |
| 2013/0117261 A1 | 5/2013 | Sambrani | |

* cited by examiner

PRESENTING A TRUSTED TAG CLOUD

BACKGROUND

The present disclosure relates to tag clouds, and more specifically, to tag clouds that identify tags contextually relevant to users.

Tag clouds are visual depictions that allow users to easily see the content of a tag source, such as a website. Tags may represent key words within the source. Tags may also represent metadata associated with the source. The tag cloud emphasizes the tags that are more popular or are associated with more frequently used key words within the source by increasing the tag's font size. The tags in the cloud may be hyperlinked to keywords within the source for the user's convenience.

Tag clouds are generally shown in real time, and new tags created by the addition of keywords or other relevant metadata are added to the tag cloud. The tag cloud may emphasize old tags over new tags because new tags have had less time to build up their keyword frequency or popularity. However, new tags may be more interesting to a frequent user because that user may have already viewed the information associated with the older tags.

SUMMARY

According to one example, a system detects a request to view a tag cloud. The system retrieves the identity of users who have applied a tag and the user requesting the view. The system may then calculate a weight based on the identities retrieved. The tag cloud may be presented according to the calculated weight.

DETAILED DESCRIPTION

Figure 1:
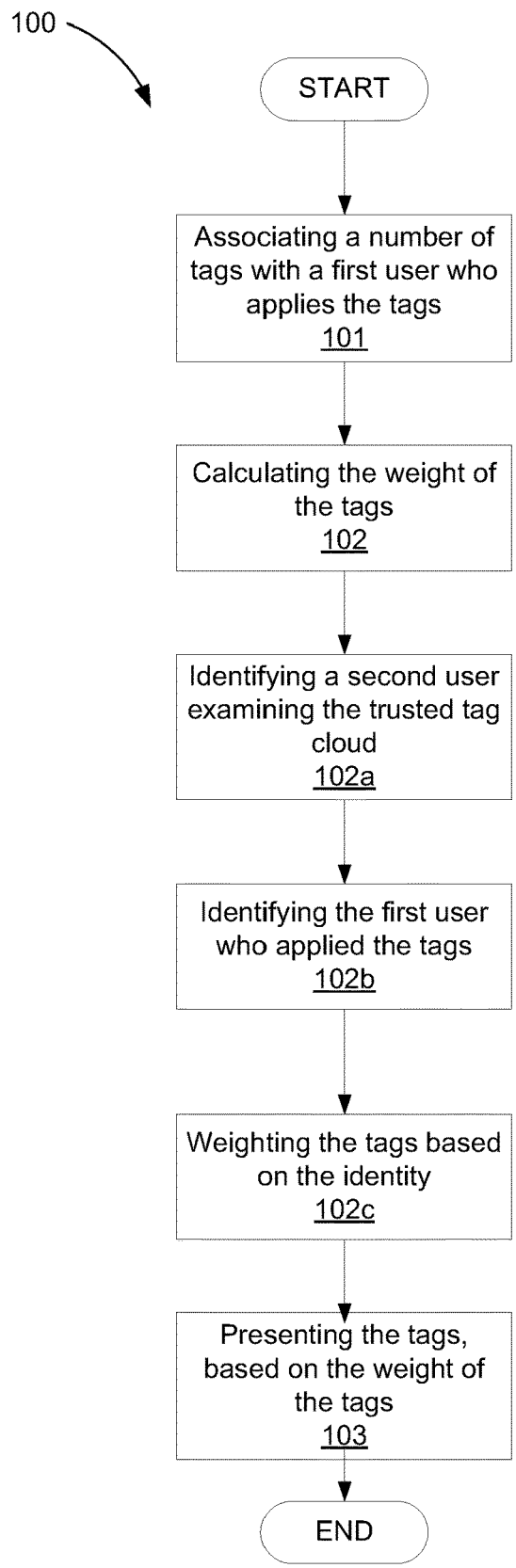
FIG. 1 is a flow chart of a method for presenting a trusted tag cloud, according to an example of the principles described herein.

Tag clouds have become a common collaborative instrument to capture and present metadata about an object, such as a news article, video, or other source of information. A tag cloud is a visual depiction of a source, such as a website. The visual depiction may be based on tags, which are generated by users to describe the content of the website. These tags may be displayed using different fonts, font sizes, colors, or grouping depending on the prominence or frequency of the information associated with the tag.

The tag clouds may present the information associated with the tag. An initial user who is viewing documents on the website or other repository may associate tags with the document. For example, if the user is viewing a document and determines that the document relates to the Oracle JAVA programming language developed by Oracle International Corporation, the user may associate a tag with that document that it is a reliable resource for JAVA.

When presenting the information on the website or other repository, the presentation may emphasize information that is of less value to the user, decreasing the benefit of the tag cloud. By using the user generated tags, a presentation of data on the website or repository may enhance the presentation based on the previous human interaction with the data.

To aid a tag cloud user in being able to effectively retrieve information from a tag cloud, a variety of methods of presenting tag clouds may be used. These methods include approaches such as listing the tags in alphabetic order, listing the tags in the order of frequency with a particular text, collocating tags in relation to a single term or pivot point, presenting tags together that have been coincidently tagged together, or attempting to discover some form of relationship between the tags.

These methods all provide different approaches to displaying information in a tag cloud, and may emphasize certain information while making other information more difficult to locate. While these methods may be advantageous if they display the information that the user wants, they may also work to obfuscate the information sought by the user.

A method calculated to present desirable information includes considering the activities of individuals that are socially connected to the user. Through consideration of social connectivity, every tag cloud may be customized to the user to emphasize information thought to be relevant by the user's peers.

A tag cloud of the present disclosure may be presented by weighting the tag in accordance to the social network of the tag cloud viewer. This may be done by associating a user who applies a tag with that tag. A weight for the tag may then be calculated by identifying the viewer of the tag cloud, and weighting the tag based on the relationship between the user who applies the tag, and the viewer of the tag cloud.

Additional information may be used in creating the weighting of the tag, including, but not limited to, a common interest or traits that the users share, a common groups to which the users belong, an employment managerial relationship, or a shared relationships between the users.

The tag cloud may then be presented based on the calculated weighting. Such presentations may include varying the size or font based on the calculated weighting. The tags may also be grouped together such that tags with similar weights are placed together, or may appear first in the tag cloud.

As used in the present specification and in the appended claims, the term "a number of" or similar language may include any positive number including one to infinity; zero not being a number, but the absence of a number.

In the following description, for purposes of explanation, numerous specific details are set forth in order to provide a thorough understanding of the present system and methods. It will be apparent, however, to one skilled in the art, that the present apparatus, system, and methods may be practiced without these specified details. Reference in the specification to "an example" or similar language means that a particular feature, structure, or characteristic described in connection with that example is included as described, but may not be included in other examples.

FIG. 1 is a flow chart of a method (100) for presenting a trusted tag cloud, according to one example of the principles described herein. The method (100) may include associating (101) a number of tags with a first user who applies the tags. The method (100) may include calculating (102) the weight of the tags including identifying (102a) a second user examining the trusted tag cloud, identifying (102b) the first user who applied the tags, and weighting (102c) the tags based on the identity of the second user examining the tags and the identity of the first user who applied the tags. The tags may be presented (103) based on the weight of the tags.

Associating (101) a number of tags with a first user who applies the tags may include any associating the tags with the user who applies the tags. For example, the tag structure may contain a list of users who have applied that tag to the content. The list may take the form of embedded data in the structure, or it may take the form of a linked list which references from the tag to the users who have applied the tag.

Another example of associating (101) a tag with a first user who applies the tag may include creating a list associated with each user of the tags that have been applied by that user. The list of tags may be stored with the user, or may be a part of a database that can be queried to retrieve information.

When a second user is viewing the trusted tag cloud, the presentation of the cloud may be customized for that user. For a number of tags in the cloud, calculating (102) the weight of the tags allows for presentation of the tags according to a number of factors, according to the principles described herein. A tag may be selected for weighting, when it is located according to a search algorithm, for specific information that may be contained in the tag. Tags may also be selected by traversing and weighting all tags associated with a website or repository, and, for each tag, calculating (102) the weight of the tag. The traversing may include a search algorithm or may be an all-encompassing traversal of all tags in the tag cloud, or portion of the tag cloud.

Calculating (102) the weight of the tags may include, but not limited to, identifying (102a) a second user examining the trusted tag cloud, and identifying (102b) the first user who applied the tags by reviewing the information from associating (101) the tags with the first user who applies the tags.

Calculation of the weight may include weighting (102c) the tags based on the identity of the second user examining the tags and the identity of the first user who applied the tags. The calculation may include any number of factors.

User identity may be based on a user's login to the system, or may be determined by other factors. The other factors may include information such as the identification of the system the user is accessing the tag cloud from, geographic information, patterns of previous behavior by the user, or similar information to characterize the user.

One example of a factor that could be considered in the calculation is the social relationship between the first user and the second user. When the first user and second user have a direct relationship, the tags applied by the first user may receive additional weight, as compared to a tag applied by a user who has no relationship to the second user. By enhancing the impact of the first user in accordance with the relationship with the second user, the tag cloud presentation will emphasize the tags applied by those with whom the second user has already indicated a relationship. The weighting may comprise comparing data preferences from the second user by examining the tags and the identity of the first user. A user, for instance, may state that they prefer the input of individuals in similar job functions. A different individual might be more interested in the direction of a company, and therefore would choose to have the CEO's tags weighted heavier. An individual may select to have certain areas of tags be weighted more heavily than other areas.

The comparison of data preferences may also include determining the indirect relationship between the second user examining the tag and the first user who applied the tag, and using that relationship in the weighting calculation. Using an indirect relationship in the calculation of weight may allow the method to emphasize the activities of a friend of a friend over tags by users that are not related.

The method may implement a consideration in weighting that users are grouped together into a number of categories, and comparing categories to which the second user examining the tag cloud and the first user who applied the tags may belong. As an example, if first user who applied the tags and the second user examining the tags are members of a marketing group, that common membership in the group may establish a relationship, allowing the tags created by the first user to receive additional weighting for the second user examining the tag cloud.

Tags may be applied to a variety of data repositories that may exceed a single service such as a website. Tags may be applied to collections, files, pages, or paragraphs within a document, or similar data repositories. The principles described herein may be applied to data in these repositories, allowing users of these repositories to receive the benefits of this method.

The weighting scheme evaluating a user or set of users who applied a tag may be received from the second user examining the tag cloud. By allowing the second user examining the tag cloud to specify the weighting scheme, each user may, according to customized preferences, receive a personalized view of the tag cloud.

A weight calculated by the principles described may be preserved by a caching algorithm to reduce recalculation in future operations. Caching may occur on a number of levels, including but not limited to caching weighting on a tag level, caching weighting for a user examining the cloud, or combinations thereof. Additionally, the calculation may be cached in whole, or only a portion of the calculation may be cached. Caching a portion of the calculation may permit the method to obtain the benefits of the caching, while preserving the ability to customize the presentation of the tag cloud for each individual user.

Figure 2:
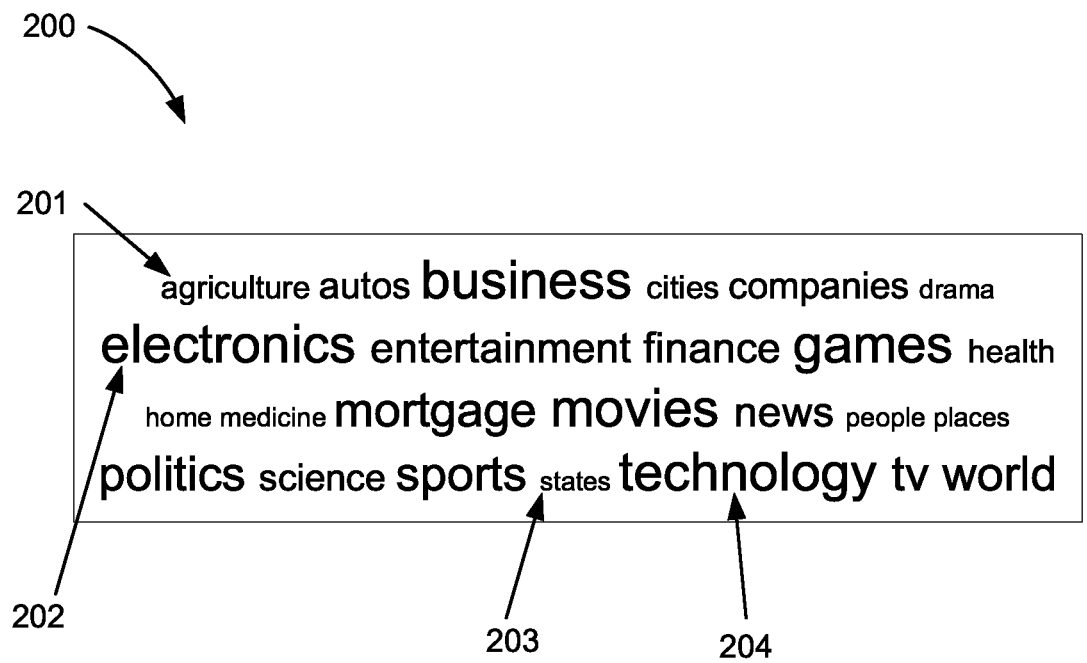
FIG. 2 is a presentation of a trusted tag cloud, according to an example of the principles described herein.

FIG. 2 represents the presentation of a tag cloud according to an example of the principles described herein. The tag cloud (200) presentation contains a number of terms representing tags within the cloud. By comparing the tag "agriculture" (201) to the tag "electronics" (202), one can clearly discern that "electronics" (202) has a more significant weighting than "agriculture" (201). A similar relationship can be seen between the tag "states" (203) and the tag "technology" (204). One may also compare "agriculture" (201) to "states" (203) and determine that "agriculture" (201) is weighted slightly better than "states" (203).

Emphasizing tags according to the weight calculated may be presented in different forms. In addition to varying the font size, the presentation may include a combination of different factors, such as varying the font, ordering the presentation based on weight, grouping the presentation based on weight, varying the color of the font based on the weighting, or combinations thereof.

The methods described herein may also allow for selectively non-weighted versions of the tag cloud. A selection may allow the cloud to be presented according to the prior algorithms presentation of the cloud, without consideration for an individual's social connections.

Figure 3:
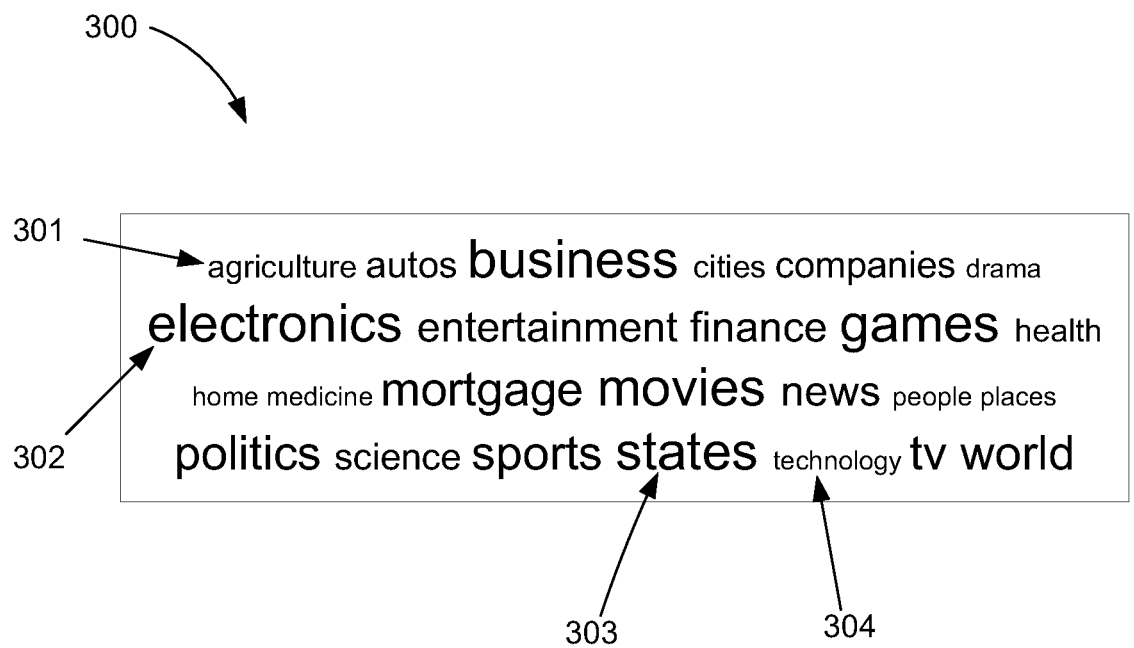
FIG. 3 is a presentation of a trusted tag cloud, according to another example of the principles described herein.

FIG. 3 represents a non-weighted version of the tag cloud (FIG. 2, 200). The tag cloud (300) is displayed using methods to determine the weight for each tag not commensurate with the present disclosure. Some tags may have the same weight, such as the tag "electronics" (302, FIG. 2, 202) and the tag "agriculture" (301, FIG. 2, 201), while others may have different weights. An examination of a change in weights based on the presentation is the tag "states" (303, FIG. 2, 203), which has a stronger weight in FIG. 3 than in FIG. 2. By comparison, the tag "technology" (304, FIG. 2, 204) has a much weaker presentation in FIG. 3 than in FIG. 2.

The comparison of FIG. 2 and FIG. 3 represents how principles described herein permit a user to focus on the information that is favored by the user's preferences and connections, rather than on other algorithms that do not consider the user's social connections.

Figure 4:
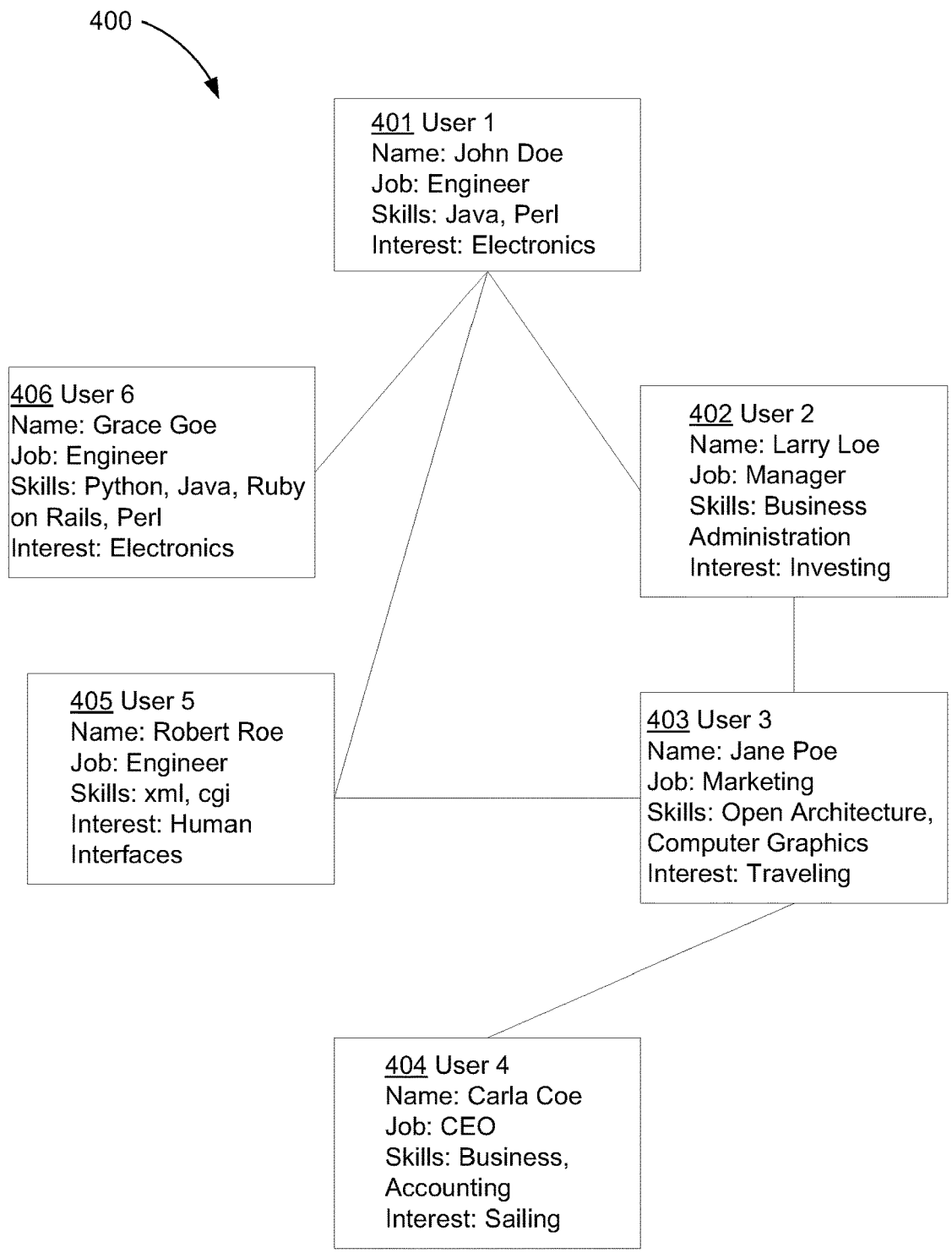
FIG. 4 is a block diagram of users of a trusted tag cloud, according to an example of the principles described herein.

FIG. 4 represents a social network of users (400) who may benefit from principals described herein. User 1 (401) is engineer John Doe, who is skilled in Oracle JAVA programming language developed by Oracle International Corporation and PERL programming language developed by Larry Wall. User 1 (401) is interested in electronics. User 1 (401) is connected to User 2 (402), User 5 (405) and User 6 (406). User 2 (402) is manager Larry Loe, who is skilled in business administration, and enjoys investing. User 2 (402) is connected to User 1 (401) and User 3 (403). User 3 (403) is Jane Poe who is skilled in marketing. User 3 (403) is skilled in architecture, and enjoys traveling. User 3 is connected to User 2 (402), User 4 (404) and User 5 (405). User 4 (404) is CEO Carla Coe, who is skilled in business and accounting. User 4 is interested in sailing. User 4 (404) is connected to User 3 (403). User 5 (405) is engineer Robert Roe. User 5 (405) is skilled in Extensible Markup Language, XML, derived from International Organization for Standards ISO 8890, and Common Gateway Interface. CGI, based on RFC 3875 by the Internet Society, and is interested in human interfaces. User 5 (405) is connected to User 1 (401) and User 3 (403). User 6 (406) is engineer Grace Goe. User 6 (406) is skilled in PYTHON programming language developed by Python Software Foundation, Oracle JAVA programming language developed by Oracle International Corporation, RUBY ON RAILS programming language developed by Rails Core Team, and PERL programming language developed by Larry Wall. User 6 (406) is also interested in electronics. User 6 (406) is connected to User 1 (401).

The social network of users (400) may be used by the principles described herein to alter presentation of the tag cloud. As an example, User 1 (401) has direct social connections to User 2 (402), User 5 (405) and User 6 (406). As a result of these connections, tags applied by User 2 (402). User 5 (405) and User 6 (406) will receive greater weight consideration than tags applied by User 3 (403) and User 4 (404) to whom User 1 (401) is not connected.

In another example, User 6 (406) has a single connection which may not adequately weight the tag cloud. In this scenario, the principles described herein may use a number of secondary social connections to provide a tag cloud weighting. This scenario may then consider the tags of users connected to User 1 (401), which are User 2 (402) and User 5 (405), to provide additional weighting information for the cloud.

While an individual may not be directly connected to an individual viewing the tag cloud, the individual may be of significance to some or all users. For example, though User 6 (406) and User 4 (404) are not directly connected to each other, User 4 (404) is a CEO. User 6 (406), who is an engineer, may benefit from providing greater weight to User 4 (404) because User 4 (404) is the CEO. This method may selectively receive weighting information from User 6 (406).

Figure 5:
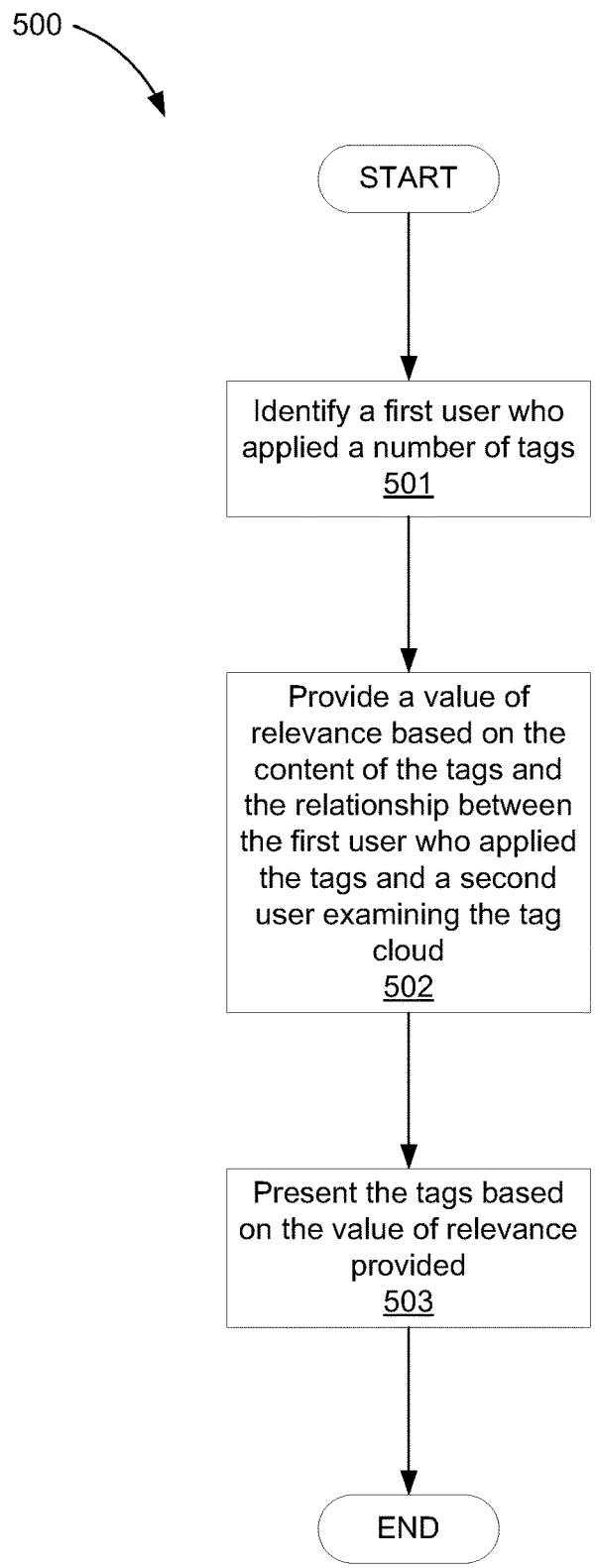
FIG. 5 is a flow chart of a method for presenting a trusted tag cloud, according to an example of the principles described herein.

FIG. 5 flow is a flow chart of a method for presenting a trusted tag cloud. In one example, FIG. 5 represents an example of a computer program product (500) for presenting a tag cloud in accordance with the principles herein, and will be described as such. However, it is to be understood that the functions of the computer program product (500) may be implemented as the processing and flow of data within a computing system. The computer program product (500) may identify (501) a first user who applied a number of tags. The system may provide (502) a value of relevance based on the content of the tags and the relationship between the first user who applied the tags and a second user examining the tag cloud. The computer program product (500) may present (503) the tags based on the value of relevance provided.

To identify (501) a first user who applied the tags, the system may incorporate any of a number of association algorithms. These algorithms may include, but are not limited to: maintaining, as part of a tag, a list of users who have applied the tags; maintaining, associated with a user, the tags that user has applied; or a database that associates the tags applied and the users who have applied the tags.

The system may provide (502) a value of relevance based on the content of the tags and the relationship between the first user who applied the tag, and a second user. The value of relevance may include factors such as the social relationship between the users, secondary relationships between the users, common groups to which the users may belong, common roles or interest between the users, employment relationships, or any rating in any category to provide an enhanced value, or combinations thereof.

Relevance may include a combination of user-specific factors, as well as general factors such as total user reference to a tag, matching content of the tag with data from the second user examining the tag cloud, relevancy to search terms, common attributes or interests between the first user who applied the tags and the second user examining the tag cloud, or combinations thereof.

The computer program product (500) may present (503) the tag based on the value of relevance. The presentation maybe based on the value calculated, varying the size of the font of the information presented, varying the font of the information presented, ordering the presentation of tags, or a similar presentation method.

Figure 6:
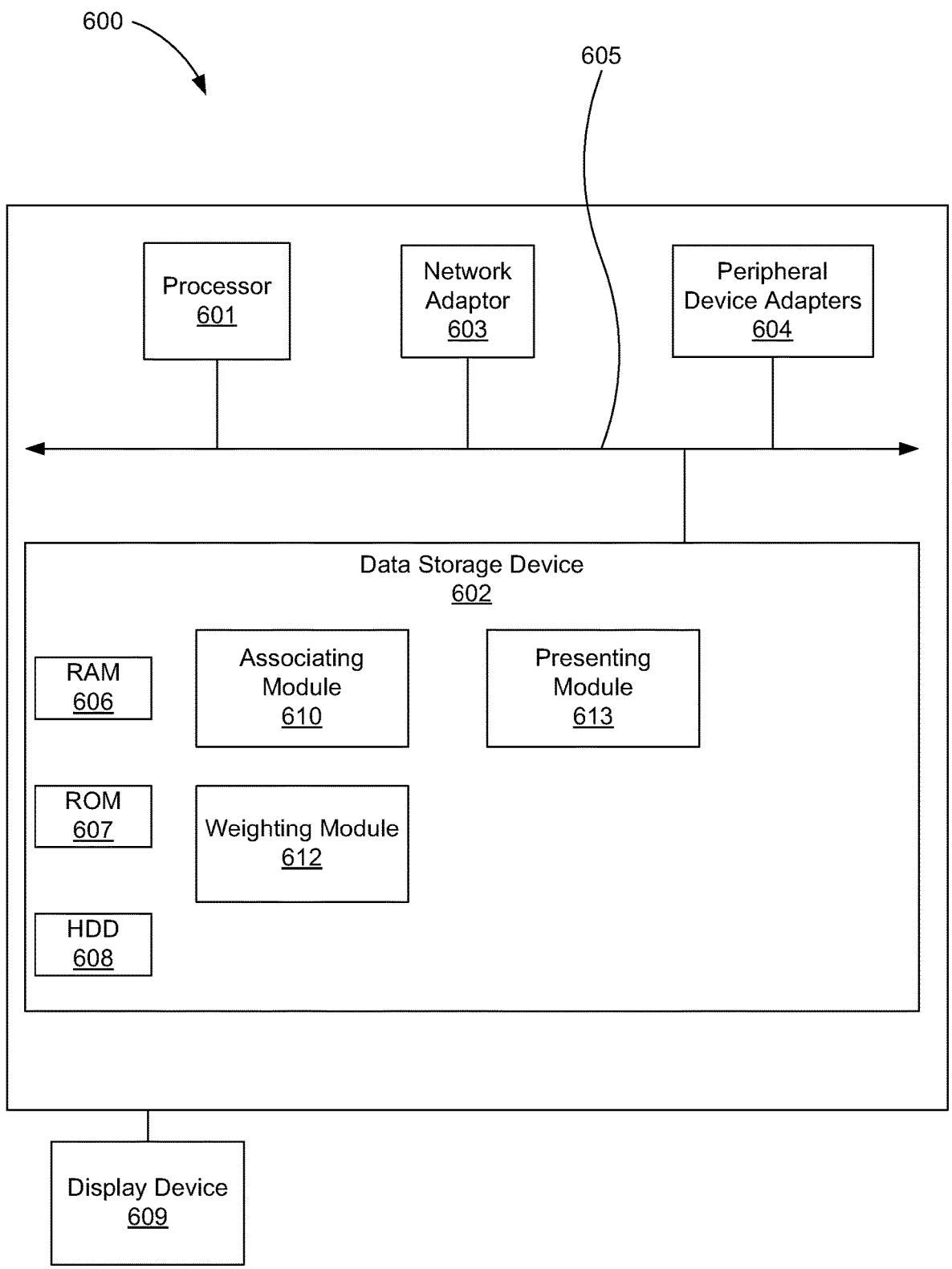
FIG. 6 is a block diagram of a system for presenting a tag cloud, according to an example of the principles described herein.

Turning now to the figures, FIG. 6 is a block diagram of a system for presenting a tag cloud (600), according to one example of the principles described herein. The system (600) may be implemented in an electronic device. Examples of electronic devices include servers, desktop computers, laptop computers, personal digital assistants (PDAs), mobile devices, smartphones, gaming systems, and tablets, among other electronic devices.

The system (600) may be utilized in any data processing scenario including, stand-alone hardware, mobile applications, through a computing network, or combinations thereof. Further, the system (600) may be used in a computing network, a public cloud network, a private cloud network, a hybrid cloud network, other forms of networks, or combinations thereof. In one example, the methods provided by the system (600) are provided as a service over a network by, for example, a third party. In this example, the service may comprise, for example, the following: a Software as a Service (SaaS) hosting a number of applications;

a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the system (600) are executed by a local administrator.

To achieve its desired functionality, the system (600) comprises various hardware components. Among these hardware components may be a number of processors (601), a number of data storage devices (602), a number of peripheral device adapters (603), and a number of network adapters (604). These hardware components may be interconnected through the use of a number of busses and/or network connections. In one example, the processor (601), data storage device (602), peripheral device adapters (603), and a network adapter (604) may be communicatively coupled via a bus (605).

The processor (601) may include the hardware architecture to retrieve executable code from the data storage device (602) and execute the executable code. The executable code may, when executed by the processor (601), cause the processor (601) to implement at least the functionality of presenting a trusted tag cloud, according to the methods of the present specification described herein. In the course of executing code, the processor (601) may receive input from and provide output to a number of the remaining hardware units.

The data storage device (602) may store data such as executable program code that is executed by the processor (601) or other processing device. As will be discussed, the data storage device (602) may specifically store computer code representing a number of applications that the processor (601) executes to implement at least the functionality described herein.

The data storage device (602) may include various types of memory modules, including volatile and nonvolatile memory. For example, the data storage device (602) of the present example includes Random Access Memory (RAM) (606), Read Only Memory (ROM) (607), and Hard Disk Drive (HDD) memory (608). Many other types of memory may also be utilized, and the present specification contemplates the use of many varying type(s) of memory in the data storage device (602) as may suit a particular application of the principles described herein. In certain examples, different types of memory in the data storage device (602) may be used for different data storage needs. For example, in certain examples the processor (601) may boot from Read Only Memory (ROM) (607), maintain nonvolatile storage in the Hard Disk Drive (HDD) memory (608), and execute program code stored in Random Access Memory (RAM) (606).

Generally, the data storage device (602) may comprise a computer readable medium, a computer readable storage medium, or a non-transitory computer readable medium, among others. For example, the data storage device (602) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (603, 604) in the system (600) enable the processor (601) to interface with various other hardware elements, external and internal to the system (600). For example, the peripheral device adapters (603) may provide an interface to input/output devices, such as, for example, display device (609), a mouse, or a keyboard. The peripheral device adapters (603) may also provide access to other external devices such as an external storage device, a number of network devices such as, for example, servers, switches, and routers, client devices, other types of computing devices, and combinations thereof.

The display device (609) may be provided to allow a user of the system (600) to interact with and implement the functionality of the system (600). The peripheral device adapters (603) may also create an interface between the processor (601) and the display device (609), a printer, or other media output devices. The network adapter (604) may provide an interface to other computing devices within, for example, a network, thereby enabling the transmission of data between the system (600) and other devices located within the network.

The system (600) may, when executed by the processor (601), display the number of graphical user interfaces (GUIs) on the display device (609) associated with the executable program code representing the number of applications stored on the data storage device (602). The GUIs may include aspects of the executable code including executable code to display a number of tag clouds, among other displayable elements. Examples of display devices (609) include a computer screen, a laptop screen, a mobile device screen, a personal digital assistant (PDA) screen, and a tablet screen, among other display devices (606).

The system (600) further comprises a number of modules used in the implementation of presenting trusted tag cloud to a user. The various modules within the system (600) comprise executable program code that may be executed separately. In this example, the various modules may be stored as separate computer program products. In another example, the various modules within the system (600) may be combined within a number of computer program products; each computer program product comprising a number of the modules.

The system (600) may include an associating module (610) to, when executed by the processor (601), associate a number of tags with a first user who applies the tags. The associating module (601) provides for an association between a number of tags and a first user who applies the tags. The association may be accomplished by methods described herein, or by similar algorithms.

The system (600) may further include a weighting module (602) to, when executed by the processor (601), provide a value of relevance based on the content of the tags, and the relationship between the first user who applied the tags and a second user examining the tags cloud. The weighting module (612), in order to provide relevance based on the content of the tags, determines the relevance of the tags to the user. The weighting may include the relationship between the first user who applies the tags and a second user examining the tag cloud. The weighting may include factors such as the direct relationship between the first and second user, the length of any indirect relationship between the first and second user, groups to which the first and second users belong, common interests or jobs between the first and second user, or similar factors.

The system (600) may further include a presenting module (613) to present the tags based on the value of relevance. The presenting module (603) presents the tags to the user. Methods of presentation may include using variable sized fonts, using a variety of fonts, using a variety of font colors, ordering the presentation of tags, grouping the presentation of tags, suppressing tags that do not achieve a minimum score, or combinations thereof. The presenting module may provide interactive data to the user.

The weighting module (612) may consider the indirect relationships between the second user examining the tags and the identity of the first user who applied the tags, to compare data preferences between the second user examining the tags and the identity of the first user who applied the tags. The weighting module (612) may also consider the relationship between the second user examining the tags and the identity of the first user who applied the tags.

The weighting module (602) may also consider groups to which the first user who applies a number of tags and a second user who is examining the tag cloud. The weights of the tags may be altered if both users belong to the same group, or the weighting may include relationships between groups to which the users belong.

The weighting module (602) may preserve the value of relevance for future reference. The value may be preserved as a complete value representing the weight, or may be preserved as a partial value, allowing the weighting module (602) to focus on analyzing data specific to the user, while reusing general data specific to the tag being examined.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for presenting a tag cloud that visually includes an indication of an underlying social network connection in the presentation of the tag cloud, the system comprising:
    a processor;
    a display device controllable by the processor;
    a data storage device to provide instructions to the processor; and
    a network adaptor to provide network access to the processor,
    the processor programmed to implement all of:
    provide a value of relevance for each tag based on a relationship that is represented by a social connection, that was previously formed in a social network of such connections, between a first user who applied the tags and a second user examining the tag cloud, wherein a model for determining relevance:
        comprises a weighting scheme provided by the second user which is based on data preferences of the second user;
        is based on both user-specific factors and general factors;
        is based on a length of an indirect relationship between the first user and the second user; and
        is based on relationships between groups to which the users belong;
    present tags having greater than a minimum score in the tag cloud, wherein:
        different tags are displayed in the tag cloud with a different appearance based on the value of relevance for each tag;
        tags which were tagged together are presented together in the tag cloud; and
        tags with similar weights are placed together; and
    suppress tags that do not achieve the minimum score from being presented in the tag cloud.

2. The system of claim 1, wherein the processor is programmed to accept input from the second user who is examining the tag cloud, the input indicating on what relationship criteria a tag should be weighted when providing a weight for that tag.

3. The system of claim 1, further comprising a weighting module programmed to assign a weight for each tag that is further based on multiple additional users who have applied the same tag and their relationships in the social network with the second user examining the tag cloud.

4. The system of claim 1, further comprising a weighting module programmed to further adjust a weight of each tag applied by the first user based on existence of a common interest shared by the first and second users.

5. The system of claim 1, further comprising a weighting module programmed to adjust a weight of each tag applied by the first user based on a trait shared by the first and second users.

6. The system of claim 1, further comprising a weighting module programmed to adjust a weight of each tag applied by the first user based on existence of a group to which both the first and second users belong.

7. The system of claim 1, further comprising a weighting module programmed to adjust a weight of each tag applied by the first user based on existence of an employment relationship between the first and second users.

8. The system of claim 1, wherein the processor is programmed to cache a final weight associated with a tag for use in subsequent display of that tag.

9. The system of claim 1, further comprising a weighting module programmed to also consider indirect relationships between the second user examining the tags and the first user who applied the tags when assigning a weight to a tag.

10. The system of claim 1, the different appearance comprising at least one of: different sizes, different fonts and different colors.

11. A computer program product comprising a non-transitory computer-readable medium with instructions for a processor of a system for presenting a tag cloud that visually includes an indication of an underlying social network connection in the presentation of the tag cloud, the system comprising:
    a processor;
    a display device controllable by the processor;
    a data storage device to provide instructions to the processor; and
    a network adaptor to provide network access to the processor,
    the instructions, when executed by the processor, causing the processor to:
    provide a value of relevance for each tag based on a relationship that is represented by a social connection, that was previously formed in a social network of such connections, between a first user who applied the tags and a second user examining the tag cloud, wherein a model for determining relevance:
        comprises a weighting scheme provided by the second user which is based on data preferences of the second user;
        is based on both user-specific factors and general factors;

is based on a length of an indirect relationship between the first user and the second user; and is based on relationships between groups to which the users belong;

present tags having greater than a minimum score in the tag cloud, wherein:

different tags are displayed in the tag cloud with a different appearance based on the value of relevance for each tag;

tags which were tagged together are presented together in the tag cloud; and tags with similar weights are placed together; and suppress tags that do not achieve the minimum score from being presented in the tag cloud.

* * * * *